United States Patent
El Abed

(10) Patent No.: US 11,593,474 B2
(45) Date of Patent: Feb. 28, 2023

(54) CONTAINER BEHAVIOR REPRESENTATION

(71) Applicant: Nokia Solutions and Networks Oy, Espoo (FI)

(72) Inventor: Haithem El Abed, Nozay (FR)

(73) Assignee: Nokia Solutions and Networks Oy, Espoo (FI)

( * ) Notice: Subject to any disclaimer, the term of this patent is extended or adjusted under 35 U.S.C. 154(b) by 345 days.

(21) Appl. No.: 17/064,197

(22) Filed: Oct. 6, 2020

(65) Prior Publication Data
US 2021/0110030 A1    Apr. 15, 2021

(30) Foreign Application Priority Data
Oct. 9, 2019   (EP) ..................................... 19202236

(51) Int. Cl.
| | | |
|---|---|---|
| G06F 21/00 | (2013.01) | |
| G06F 21/54 | (2013.01) | |
| G06N 20/00 | (2019.01) | |
| G06F 9/455 | (2018.01) | |
| G06F 9/54 | (2006.01) | |

(Continued)

(52) U.S. Cl.
CPC .......... *G06F 21/54* (2013.01); *G06F 9/45558* (2013.01); *G06F 9/546* (2013.01); *G06F 9/547* (2013.01); *G06N 20/00* (2019.01); *H04L 63/1425* (2013.01); *G06F 2009/45591* (2013.01); *G06F 2221/033* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 9,684,524 B1* | 6/2017 | Porter | ................. G06F 11/3452 |
| 9,860,262 B2 | 1/2018 | Mainieri et al. | |
| 9,998,330 B1* | 6/2018 | Peterson | ............. H04L 41/5019 |

(Continued)

OTHER PUBLICATIONS

Rao, D.T.V. Ramakrishna. Efficient stack sizing for very large software systems. 2006 International Conference on Computing & Informatics. https://ieeexplore.ieee.org/stamp/stamp.jsp?tp=&arnumber=5276453 (Year: 2006).*

(Continued)

*Primary Examiner* — Jeremiah L Avery
(74) *Attorney, Agent, or Firm* — Nokia Technologies Oy

(57) ABSTRACT

For building a representation of behavior of a container, an apparatus is able to:
- inject a probe in an operating system associated with the container to monitor system calls coming from the container,
- produce records for respective system calls, each record containing an identifier of a system call and a stack size used by the container for the system call, the records being put in an ordered queue,
- process the records in the ordered queue into a graph comprising nodes respectively associated with used stack sizes and edges respectively associated with identifiers of system call between nodes,
- wherein an edge from one record is associated with the identifier of the system call of the one record and links a node associated with a previous record to the node associated with the one record.

15 Claims, 3 Drawing Sheets

(51) Int. Cl.
*H04L 9/40* (2022.01)
*G06Q 10/10* (2023.01)

(56) References Cited

U.S. PATENT DOCUMENTS

| | | | |
|---|---|---|---|
| 9,998,562 B1* | 6/2018 | Peterson | G06F 11/30 |
| 10,027,697 B1 | 7/2018 | Babun et al. | |
| 2018/0357068 A1 | 12/2018 | Ambichl et al. | |
| 2019/0108336 A1 | 4/2019 | Gurkok et al. | |
| 2020/0401386 A1* | 12/2020 | Punathil | G06F 8/433 |

OTHER PUBLICATIONS

Bisson, Gilles; Blanch, Renaud. Improving Visualization of Large Hierarchical Clustering. 2012 16th International Conference on Information Visualisation. https://ieeexplore.ieee.org/stamp/stamp.jsp?tp=&arnumber=6295817 (Year: 2012).*

"3rd Generation Partnership Project; Technical Specification Group Services and System Aspects; System Architecture for the 5G System; Stage 2 (Release 16)", 3GPP TS 23.501, V16.1.0, Jun. 2019, pp. 1-368.

Aljebreen, "Towards Intelligent Intrusion Detection Systems for Cloud Computing", Dissertation, Jun. 2018, 147 pages.

Kolbitsch et al., "Effective and Efficient Malware Detection at the End Host", Proceedings of the 18th conference on USENIX security symposium, Aug. 2009, pp. 351-398.

Abed, "Securing Cloud Containers Through Intrusion Detection and Remediation", Dissertation, Aug. 1, 2017, 100 pages.

Abed et al., "Intrusion Detection System for Applications Using Linux Containers", arXiv, Nov. 9, 2016, 13 pages.

Extended European Search Report received for corresponding European Patent Application No. 19202236.6, dated Mar. 25, 2020, 8 pages.

Lin et al., "Microscope: Pinpoint Performance Issues with Causal Graphs in Micro-service Environments", International Conference on Service-Oriented Computing, 2018, pp. 3-20.

Thalheim et al., "Sieve: Actionable Insights from Monitored Metrics in Microservices", arXiv, Sep. 20, 2017, 17 pages.

Or Meir et al., "Dynamic Malware Analysis in the Modern Era-A State of the Art Survey", ACM Computing Surveys, vol. 52, No. 5, Sep. 2019, pp. 88:1-88:48.

* cited by examiner

CONTAINER BEHAVIOR REPRESENTATION

TECHNICAL FIELD

Various example embodiments generally relate to the field of monitoring of cloud services and the execution of containers.

BACKGROUND 5G networks are moving towards flexible platform with native microservice support. The 3GPP standards for 5G are using Service Based Architecture to define the interaction between Network Functions. This Service Based Architecture is conducive to the use of microservices for implementing Network Functions. Microservice based design is a method of design that depart from the traditional monolithic design approach, by dividing the service into multiple components that could be designed, implemented, distributed and deployed independently from each other's. The service becomes modularized, flexible and adaptable.

It allows for fast deployment cycles and updates as well as for launching services on demand in the network. In terms of packaging, Microservices are typically deployed as containers in the context of cloud native. Multiple distinct parties could intervene in the lifecycle of a microservice from development, packaging, distribution and updates. This create an attack surface that could potentially be exploited by a bad actor.

Once deployed, and during their operations, containers may get compromised either through the exploitation of a vulnerability in the running software, or through the update mechanisms for example. It can still provide the intended service but will also have an additional unintended behavior.

Lots of attention in the past have been focused on misuse detection, which is to learn the bad behavior and then try to detect it, this could be done through static or dynamic signatures, this approach is subject to polymorphism attacks (the bad actors keep making small changes to the malware in order to avoid detection).

There is a need to define and build the behavior of a running container, allowing to detect such a deviation from the baseline during operation.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, a method for building a representation of behavior of a container, the method comprising:

injecting a probe in an operating system associated with the container to monitor system calls coming from the container, producing records for respective system calls, each record containing an identifier of a system call and a stack size used by the container for the system call, the records being put in an ordered queue, processing the records in the ordered queue into a graph comprising nodes respectively associated with used stack sizes and edges respectively associated with identifiers of system call between nodes, wherein an edge from one record is associated with the identifier of the system call of the one record and links a node associated with a previous record to the node associated with the one record.

Advantageously, it is provided a new innovative construction that is suitable for processing by intelligent artificial agents.

Advantageously, the graph encodes the behavior of the running container. It has the advantages of being suitable for processing by automated intelligent agents, and at the same time displayable visually for easy interpretation by human analysts.

In an embodiment, the monitoring of system calls coming from the container comprises collecting context information related to systems calls from an execution trace of the container.

In an embodiment, an edge is associated with the identifiers of system call of respective consecutive records having the same used stack size.

In an embodiment, the record contains a timestamp corresponding to the system call.

In an embodiment, the execution trace is obtained from the container running during a specific time.

In an embodiment, the size of a node is based on the number of records having the same used stack size.

In an embodiment, the size of an edge is based on an average time spent in the previous node linked to the edge.

In another implementation there is provided for building a representation of behavior of a container, comprising:

means for injecting a probe in an operating system associated with the container to monitor system calls coming from the container, means for producing records for respective system calls, each record containing an identifier of a system call and a stack size used by the container for the system call, the records being put in an ordered queue, means for processing the records in the ordered queue into a graph comprising nodes respectively associated with used stack sizes and edges respectively associated with identifiers of system call between nodes, wherein an edge from one record is associated with the identifier of the system call of the one record and links a node associated with a previous record to the node associated with the one record.

In another implementation there is provided a computer-readable medium having embodied thereon a computer program for executing a method for securing user inputs in a mobile device. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

Figure 1:
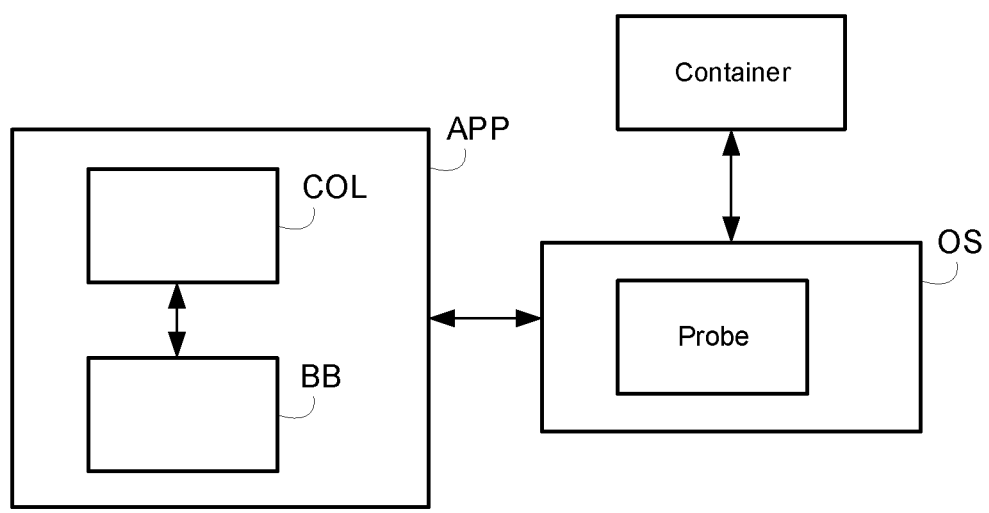
FIG. 1 illustrates a schematic block diagram of a communication system according to one embodiment of the invention for building a representation of the behavior of a container.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

A container is a software package that contains everything the software needs to run. This includes the executable program as well as system tools, libraries, and settings. Containers are not installed like traditional software programs, which allows them to be isolated from the other software and the operating system itself. For example, a server running three containerized applications runs a single operating system, and each container shares the operating system kernel with the other containers. Shared parts of the operating system are read only, while each container has its own mount (i.e., a way to access the container) for writing.

Container based virtualization technologies have gained great importance for the management and operation of applications of all types. In contrast to hypervisor based virtualization technologies that are based on specialized hypervisor operating systems that manage and abstract physical hardware to provide virtual computer systems on which conventional operating systems can be executed, container based virtualization uses features provided by an operating system to create isolated execution environments for processes which are called container. Processes executed in those containers are provided with an execution environment that simulates a separate operating system.

In computing, a system call is the programmatic way in which a computer program requests a service from the kernel of the operating system it is executed on. A system call is a way for programs to interact with the operating system. A computer program makes a system call when it makes a request to the operating system's kernel. System call provides the services of the operating system to the user programs via Application Program Interface (API). It provides an interface between a process and operating system to allow user-level processes to request services of the operating system. System calls are the only entry points into the kernel system. All programs needing resources must use system calls. Especially, during the running of a container, a process of the container may request system calls at several times for different purposes.

For example, services provided by system calls are the following: process creation and management, main memory management, File Access, Directory and File system management, device handling (I/O), networking, etc. . . .

For example, the types of system calls are the following: Process control (end, abort, create, terminate, allocate and free memory), file management (create, open, close, delete, read file etc), device management, information maintenance, communication.

A process represents a running program; it is an instance of an executing program. A process corresponds to an amount of memory and a set of data structures. The kernel uses these data structures to store important information about the state of the program.

Any process begins executing with three logical areas of memory called text, data and stack. The text area is read-only and shared, while the data and stack areas are private to the process. Both the data and stack areas may be extended and contracted on program request. Stack contains all local variables & data, intermediate storage for registers, and function parameters.

A typical stack is an area of computer memory with a fixed origin and a variable size. Initially the size of the stack is zero. A stack pointer, usually in the form of a hardware register, points to the most recently referenced location on the stack; when the stack has a size of zero, the stack pointer points to the origin of the stack.

Referring to FIG. 1, disclosed herein an apparatus APP for building a representation of a running container. The apparatus APP includes a collection module COL and a baseline builder module BB. The apparatus is able to perform a method for building the representation of a container that runs with an operating system implemented in a computing device comprising one or more processor(s), I/O interface(s), and a memory coupled to the processor(s).

The functions realized by the processor of the computing device may be provided through the use of dedicated hardware as well as hardware capable of executing software in association with appropriate software. When provided by a processor, the functions may be provided by a single dedicated processor, by a single shared processor, or by a plurality of individual processors, some of which may be shared. The memory may include any computer-readable medium known in the art including, for example, volatile memory, such as static random access memory (SRAM) and dynamic random access memory (DRAM).

The collection module COL is responsible for the interaction with the operating system OS, contains a probe that is injected in the operating system OS to monitor system calls coming from the container. When the collection module COL intercepts a system call, it builds a record containing an identifier of the system call, a timestamp of the occurrence of the system call and the stack size used by the process running inside the container at the time of the system call.

The baseline builder module BB processes one record at the time. It keeps in its local memory the last record processed (referred as the previous record). The baseline builder module BB is able to build a behavior graph that is stored and updated according to a building algorithm. The behavioral graph is a directed multi-graph wherein multiple edges could coexist between nodes.

In the graph, each node and each edge have an identifier (a label): for the nodes, the identifier is the used stack size, and for the edge the identifier is the sequence of system calls that has triggered a transition from one node to another node, i.e. a set of identifiers of system call.

In addition to the identifier, nodes and edges have attributes. One attribute is the node count that corresponds to the number of times this container execution went through this node, i.e. the number of times the corresponding system call has occurred. In the graph, a relative size of nodes captures this attribute. One attribute for node is the "last seen" that is not stored in the saved baseline but will always be computed during the construction of the baseline (as well as during the monitoring of the container when it can be checked for deviation).

Similarly, one attribute is an edge count that corresponds to the number of times this edge has been traversed, and one attribute is the transition time attribute that corresponds to the time spent in the previous node before going through this edge, the average and standard deviation of this transition time attribute being stored.

Figure 2:
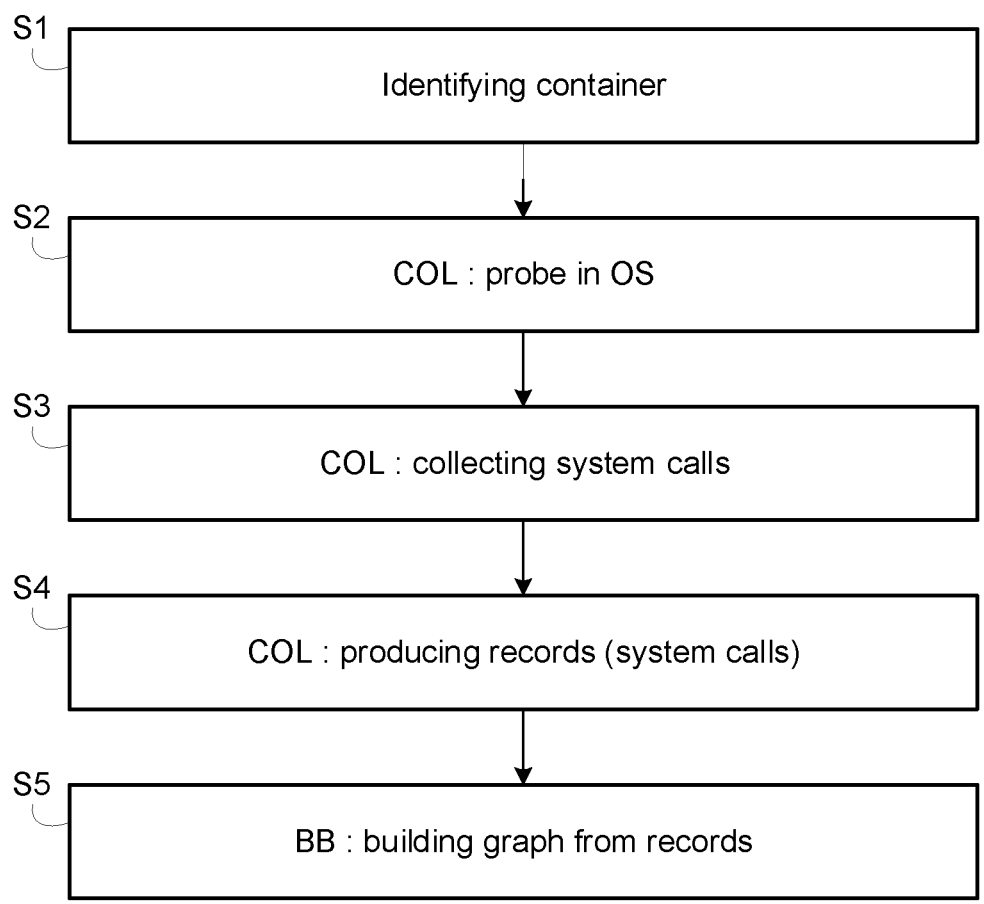
FIG. 2 illustrates a flow chart illustrating a method for building a representation of the behavior of a container according to one embodiment of the invention.

With reference to FIG. 2, a method for building a representation of the behavior of a container according to one embodiment of the invention comprises steps S1 to S5.

In step S1, the apparatus is connected to the operating system of a computing device and identifies a container working with the operating system.

In step S2, the collection module COL injects a probe in the operating system OS of the computing device to monitor system calls coming from the container. The probe is able to produce an execution trace of the container during a specific time, for example a time needed for a test of the operation of the container (by executing the container with a set of requests tailored for testing the container before deployment).

In step S3, the collection module COL collects system calls from the execution trace. More precisely, when the probe detects a system call, the probe sends the identifier of the system call with a corresponding timestamp to the collection module. The collection module thus retrieves the used stack size at the time of the system call.

In step S4, the collection module COL produces records for respective system calls, each record containing an identifier of a system call and a stack size used by the container for the system call. The collection module COL stores the records being in an ordered queue.

In step S5, the baseline builder module BB processes one record at the time in the ordered queue to build a representation of the container under the form of a graph that is stored. The graph is a directed multi-graph containing multiple nodes linked between them through one or several edges. Thus the records are transformed into a graph comprising nodes respectively associated with used stack sizes and edges respectively associated with identifiers of system call between nodes.

More especially, an edge of the graph produced from one record is associated with the identifier of the system call of said one record and links a node associated with a previous record (i.e. previously used stack size) to the node associated with the said one record (i.e. used stack size at the time of the system call).

When dequeuing the records, the baseline builder module BB can identify a sequence of system calls, the sequence of system calls containing one or several system calls, that triggers a modification of the used stack size, i.e. there is a sequence of records with the same used stack size. In that case, the baseline builder module BB produces a node for the next record after the sequence of record, said node being identified by the used stack size of said next record and an edge identified by the sequence of system calls of said sequence of records and by the system call of said next record.

The produced node and edge reflect the node and edge attributes. The relative size of the node represents the number of time the corresponding system call has occurred. The relative size of the edge represents a transition time that corresponds to the time spent in the previous node before going to the current node through this edge.

In one embodiment, the records created by the collection module are dequeued one at the time and processed according to the following algorithm:
1. Lookup if there is a node in the baseline graph with the ID equals to the stack size:
    a. IF the node doesn't exist:
        i. IF there is no previous node (no previous input record) then this is the very first node:
            1. Add node with ID=stack size and attributes: init (Count), init(LastSeen)
        ii. IF there is a previous node:
            1. Add node with ID=stack size and attributes: init(Count), init(LastSeen)
            2. Add Edge from Previous Node to the new Node with:
                a. ID=Syscall ID and attributes:
                b. edgeCount=init(edgeCount)
                c. MeanTransitionTime=init(Mean)
                d. STD_TransitionTime=init(STD)
    b. IF the node exists:
        i. Check Edges between previous node and current node:
            1. If Edge doesn't exit:
                a. Create Edge:
                    i. Id=syscall ID
                    ii. edgeCount=init(edgeCount)
                    iii. MeanTransitionTime=init(Mean)
                    iv. STD_TransitionTime=init(STD)
            2. Else Update Edge:
                a. edgeCount=Increment(edgeCount)
                b. MeanTransitionTime=update(Mean)
                c. STD_TransitionTime=update(STD)
        ii. Update Node: Count=increment(count), update (LastSeen)

When the baseline building module is started, it reads the current baseline graph it is building, if it is the very first time that it starts, the baseline graph will be empty, otherwise there will be an existing one.

Figure 3:
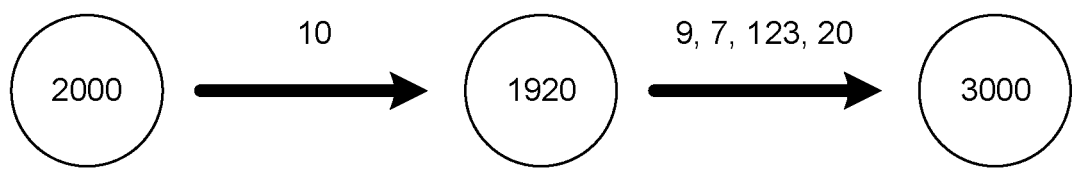
FIG. 3 illustrates an example of a graph representing a container behavior.

In one example illustrated in FIG. 3, the collection module stores records containing the following information "identifier of system call; used stack size": "5; 2000", "10; 1920", "9; 1920", "7; 1920", "123; 1920", "20, 3000".

The baseline builder process the records to build the graph having three nodes identified by "2000", "1920" and "3000" and two edges identified by "10" and the sequence "9, 7, 123, 20", as illustrated in FIG. 3.

In one embodiment the apparatus comprises one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

The invention claimed is:

1. A method for building a representation of behavior of a container, the method comprising:
    injecting a probe in an operating system associated with the container to monitor system calls coming from the container,
    producing records for respective system calls, each record containing an identifier of a system call and a stack size used by the container for the system call, the records being put in an ordered queue,
    processing the records in the ordered queue into a graph comprising nodes respectively associated with used stack sizes and edges respectively associated with identifiers of system call between nodes,
    wherein an edge from one record is associated with the identifier of the system call of the one record and links a node associated with a previous record to the node associated with the one record.

2. The method as claimed in claim 1, wherein the monitoring of system calls coming from the container comprises collecting context information related to systems calls from an execution trace of the container.

3. The method as claimed in claim 1, wherein an edge is associated with the identifiers of system call of respective consecutive records having the same used stack size.

4. The method as claimed in claim 1, wherein the record contains a timestamp corresponding to the system call.

5. The method as claimed in claim 2, wherein the execution trace is obtained from the container running during a specific time.

6. The method as claimed in claim 1, wherein the size of a node is based on the number of records having the same used stack size.

7. The method as claimed in claim 1, wherein the size of an edge is based on an average time spent in the previous node linked to the edge.

8. An apparatus, comprising:
    at least one processor;
    at least one memory including computer program code, the memory and the computer program code configured to, working with the at least one processor, cause the apparatus to
    inject a probe in an operating system associated with the container to monitor system calls coming from the container,
    produce records for respective system calls, each record containing an identifier of a system call and a stack size used by the container for the system call, the records being put in an ordered queue,
    process the records in the ordered queue into a graph comprising nodes respectively associated with used stack sizes and edges respectively associated with identifiers of system call between nodes,
    wherein an edge from one record is associated with the identifier of the system call of the one record and links a node associated with a previous record to the node associated with the one record.

9. The apparatus according to claim 8, wherein the monitoring of system calls coming from the container comprises collecting context information related to systems calls from an execution trace of the container.

10. The apparatus according to claim 8, wherein an edge is associated with the identifiers of system call of respective consecutive records having the same used stack size.

11. The apparatus according to claim 8, wherein the record contains a timestamp corresponding to the system call.

12. The apparatus according to claim 8, wherein the execution trace is obtained from the container running during a specific time.

13. The apparatus according to claim 8, wherein the size of a node is based on the number of records having the same used stack size.

14. The apparatus according to claim 8, wherein the size of an edge is based on an average time spent in the previous node linked to the edge.

15. A non-transitory computer readable medium having encoded thereon statements and instructions to cause a processor to
    inject a probe in an operating system associated with the container to monitor system calls coming from the container,
    produce records for respective system calls, each record containing an identifier of a system call and a stack size used by the container for the system call, the records being put in an ordered queue,
    process the records in the ordered queue into a graph comprising nodes respectively associated with used stack sizes and edges respectively associated with identifiers of system call between nodes,
    wherein an edge from one record is associated with the identifier of the system call of the one record and links a node associated with a previous record to the node associated with the one record.

* * * * *